W. S. RUNNELS.
CUTTER.
APPLICATION FILED SEPT. 5, 1919.
1,359,748.
Patented Nov. 23, 1920.
2 SHEETS—SHEET 1.
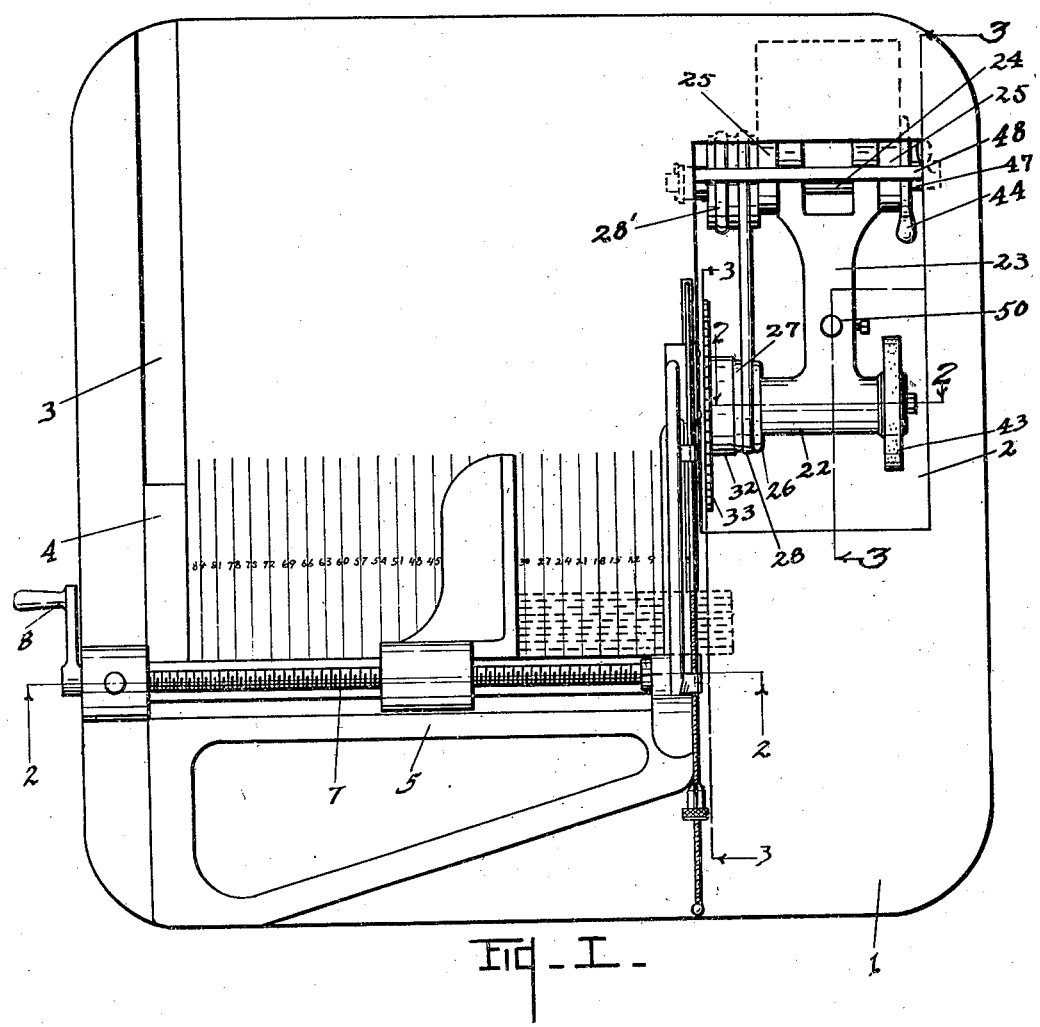
Fig. I.
Inventor
Walter S. Runnels

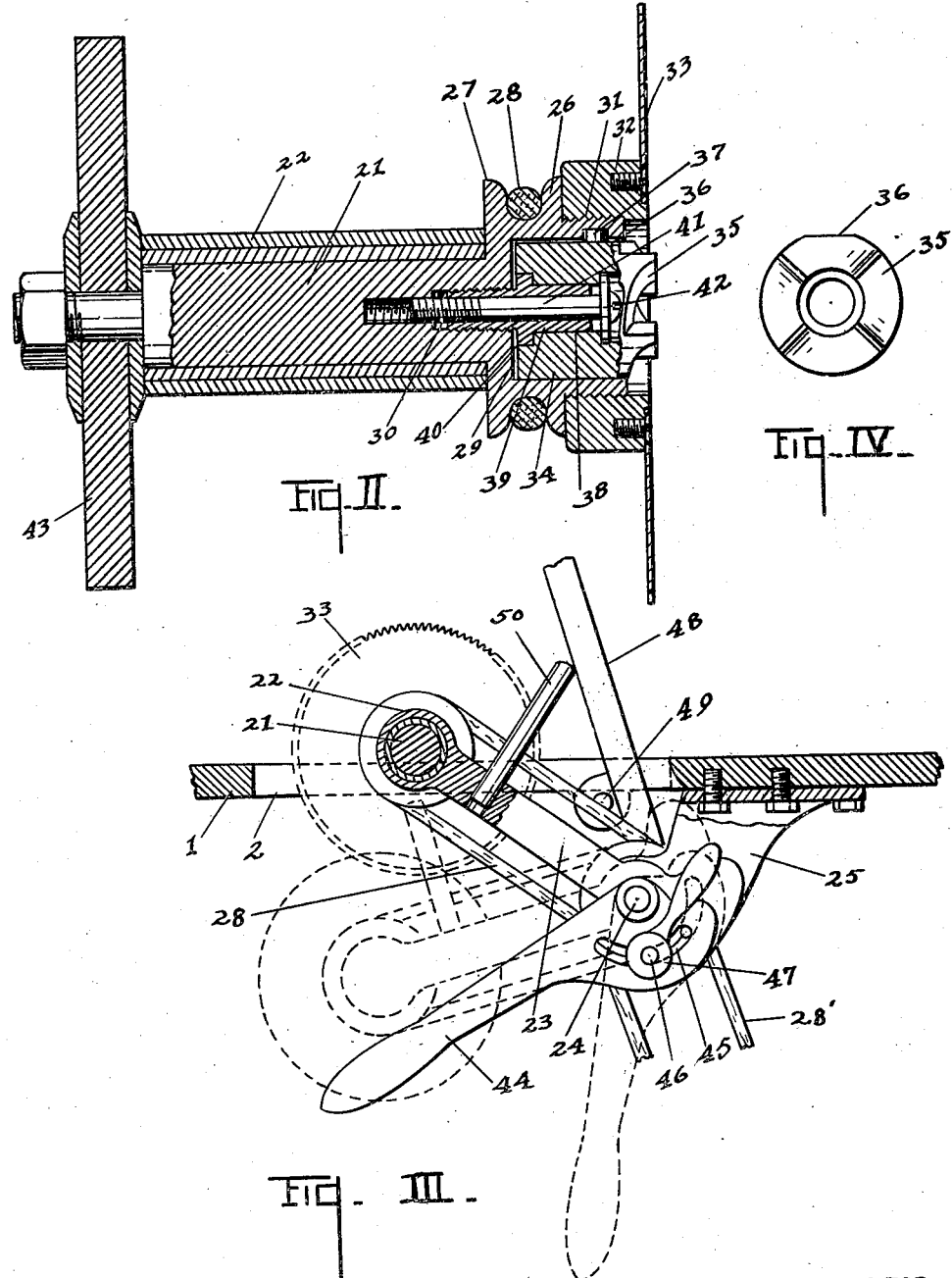

UNITED STATES PATENT OFFICE.

WALTER S. RUNNELS, OF KALAMAZOO, MICHIGAN.

CUTTER.

1,359,748.     Specification of Letters Patent.     Patented Nov. 23, 1920.

Application filed September 5, 1919. Serial No. 321,911.

*To all whom it may concern:*

Be it known that I, WALTER S. RUNNELS, a citizen of the United States, residing at the city and county of Kalamazoo, State of Michigan, have invented certain new and useful Improvements in Cutters, of which the following is a specification.

The main objects of this invention are:

First, to provide an improved cutter for metal sawing and trimming machines.

Second, to provide an improved cutter for metal sawing and trimming machines which is comparatively simple and economical in structure and very convenient to adjust.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a plain view of my improved sawing and trimming machine, a piece of work being indicated by dotted lines, the saw being indicated in its raised or working position.

Fig. II is an enlarged vertical section on a line corresponding to line 2—2 of Fig. I, showing details of the saw and cutter.

Fig. III is a detail vertical section on a line corresponding to the broken line 3—3 of Fig. I, showing details of the mounting for the saw and cutter, the parts being shown conventionally and in their lowered position by the dotted lines.

Fig. IV is an end view of the cutter head.

In the drawing similar reference characters refer to similar parts throughout the several views, and the sectional views are taken looking in the direction of the little arrows at the ends of the section lines.

Referring to the drawing, I have illustrated only the top of the table 1. The table has an opening 2 therein through which the saw and cutter may be swung to and from the work. The top has a groove-like way 3 for the guiding slide 4 of the carriage 5 which travels or slides upon the table, the carriage being guided in its movement by the slide and way.

Means are provided for gaging and clamping the work.

The arbor 21 is carried in a bearing 22 at the outer end of the arm 23 which is fixed to the rock shaft 24, carried by a bracket 25 on the under side of the table. The arbor is provided with a head 26 at one end having a pulley 27 thereon connected by the belt 28 to a driving pulley 28' on the rock shaft 24. The head has a cylindrical recess 29 therein as an axial bore 30. The arbor is externally threaded at 31 to receive the supporting collar 32 of the saw 33. The head 34 provided with end cutters 35 is adapted to be arranged in the recess 29 of the arbor. The cutter head has a flattened side 36 which is engaged by the internal lug 37 to prevent rotation of the cutter head relative to the arbor. The cutter head has an axial bore 38 shouldered at each end. The cutter head adjusting member 39 engages this axial bore and is threaded into the larger bore of the arbor for adjustment therein, thereby axially supporting the cutter head, the adjusting member being provided with a thrust collar 40 engaging the inner shoulder of the cutter head.

The clamping screw 41 is arranged through the adjusting member and is threaded into the smaller bore of the arbor. This clamping screw has a collar 42 engaging the outer shoulder of the cutter head.

With this arrangement of the parts, the cutter head may be conveniently adjusted so that its cutters project the desired distance beyond the face of the saw. The saw 32 may be removed for sharpening or substitution of another saw as the occasion may require.

The arbor is preferably provided with an emery wheel or grinding disk 43. The rock shaft 24 is provided with an adjusting lever 44 having a segmental slot 45 therein through which the threaded pin 46 projects to receive the clamping nut 47 so that the saw and trimmer may be readily clamped or secured in any adjusted position.

Having thus described my invention, what I claim as new and desire to secure by Letters Patent is:

1. The combination of an arbor having a cylindrical recess and a stepped axial bore at one end, a saw having a central hole therein and provided with a supporting collar threaded upon said arbor, a cylindrical cutter head provided with cutters on its end disposed in said recess, said cutter head being flattened on one side and having a central bore shouldered at each end, an internal lug in said chamber engaging the said flattened surface of said cutter head preventing its rotation relative to the arbor, a cutter head adjusting member threaded into the larger bore of said arbor and projecting into the bore of said cutter head to engage its inner shoulder, and a clamping screw disposed through said cutter head and its said adjusting member and threaded into the smaller bore of said arbor, said clamping screw having a collar thereon engaging the outer shoulder of said cutter head bore.

2. The combination of an arbor having a recess and a stepped axial bore at one end, a saw having a central hole therein and provided with a supporting collar threaded upon said arbor, a cutter head provided with cutters on its end disposed in said recess, a cutter head adjusting member threaded into the larger bore of said arbor and projecting into the bore of said cutter head to engage its inner shoulder, and a clamping screw disposed through said cutter head and its said adjusting member and threaded into the smaller bore of said arbor, said clamping screw having a collar thereon engaging the outer shoulder of said cutter head bore.

3. The combination of an arbor having a cylindrical recess at one end, a saw having a central hole therein and provided with a supporting collar mounted on said arbor, a cylindrical cutter head provided with cutters on its end disposed in said recess with its cutters projecting beyond the face of the saw, said cutter head being flattened on one side, an internal lug in said chamber engaging the said flattened surface of said cutter head preventing its rotation relative to the arbor, a cutter head adjusting member threaded into said arbor, and a clamping screw for said cutter head disposed therethrough and through its adjusting member and threaded into said arbor.

4. The combination of an arbor having a recess at one end, a saw having a central hole therein and provided with a supporting collar on said arbor, a cutter head provided with cutters on its end disposed in said recess with its cutters projecting beyond the face of the saw, a cutter head adjusting screw threaded into said arbor for adjustment axially thereof, and a clamping screw for said cutter head disposed through said adjusting member and threaded into said arbor.

5. The combination of an arbor having a recess at one end, a saw having a central hole therein and provided with a supporting collar on said arbor, a cutter head provided with cutters on its end disposed in said recess with its cutters projecting beyond the face of the saw, a cutter head adjusting screw threaded into said arbor for adjustment axially thereof, and a clamping screw for said cutter head.

In witness whereof, I have hereunto set my hand and seal in the presence of two witnesses.

WALTER S. RUNNELS. [L. S.]

Witnesses:
   LUELLA G. GREENFIELD,
   GRACE B. THOMPSON.